United States Patent [19]
Johnson

[11] Patent Number: 5,073,081
[45] Date of Patent: Dec. 17, 1991

[54] AUTOMATIC SELF-CONTAINED STACKING MACHINE

[76] Inventor: Nolton C. Johnson, 1221 NE. 6th St., Bend, Oreg. 97701

[21] Appl. No.: 394,108

[22] Filed: Aug. 14, 1989

[51] Int. Cl.$^5$ ............................................. B65G 57/18
[52] U.S. Cl. .................................. 414/786; 414/793.4; 414/791.6; 198/468.8; 198/772; 198/773; 198/775
[58] Field of Search .................. 414/786, 793.4, 791.6, 414/794.4, 794.7, 794.3, 785; 198/468.8, 772, 773, 775

[56] References Cited

U.S. PATENT DOCUMENTS

| | | | |
|---|---|---|---|
| 2,325,889 | 8/1943 | Thompson et al. | 198/468.8 X |
| 3,295,703 | 1/1967 | Schiepe | 414/791.6 |
| 3,557,975 | 1/1971 | Amerio | 198/746 |
| 3,941,048 | 3/1976 | Oe et al. | 414/794.3 X |
| 4,162,016 | 7/1979 | Schmitt | 414/794.3 |
| 4,193,725 | 3/1980 | Schiepe et al. | 414/794.3 X |
| 4,214,848 | 7/1980 | Verwey et al. | 414/791.6 X |
| 4,229,134 | 10/1980 | Reist | 414/790.3 |

FOREIGN PATENT DOCUMENTS

| | | | |
|---|---|---|---|
| 2907512 | 8/1980 | Fed. Rep. of Germany | 414/794.3 |
| 3030419 | 3/1982 | Fed. Rep. of Germany | 414/793.4 |
| 0110427 | 4/1989 | Japan | 414/794.3 |
| 0171433 | 11/1982 | Netherlands | 414/791.6 |
| 0590220 | 1/1978 | U.S.S.R. | 414/793.4 |

*Primary Examiner*—Frank E. Werner
*Assistant Examiner*—James Eller

*Attorney, Agent, or Firm*—Marger, Johnson, McCollom & Stolowitz, Inc.

[57] ABSTRACT

The present invention comprises devices for receiving a plurality of elongated workpieces, devices for automatically raising the workpieces, devices for forming a single layer of a predetermined number of workpieces, devices for controlling the height and width of a stack, devices for assembling layers of workpieces into a stack of predetermined height and width, and devices for supporting and positioning the stack during formation. The self-contained machine of this invention is designed for producing a stack of elongate, stackable workpieces. The machine comprises devices for receiving the elongate, stackable workpieces and for conveying the workpieces in a generally vertical upward direction to an elevated point above the surface on which the stacking machine is supported. Vertical conveyance of the work pieces requires the use of a minimum lateral space for conducting that operation as opposed to armtype hoisting stackers in which the arm is extended and takes up a significant amount of lateral space. The devices for receiving the workpieces are at the elevated point and devices for infeeding the workpieces to a stackable layer formation device are also provided. The lateral area in which all of the stack formation operations are conducted extends from this elevated point for infeeding the workpieces and, as opposed to known prior art stackers, to the outer longitudinal edge of the workpiece stack. Thus, the subject invention includes devices for forming a stackable layer of the infed workpieces and devices for depositing the formed stackable layer, both of which are located during use substantially within the above-described lateral area.

11 Claims, 8 Drawing Sheets

FIG. 4A
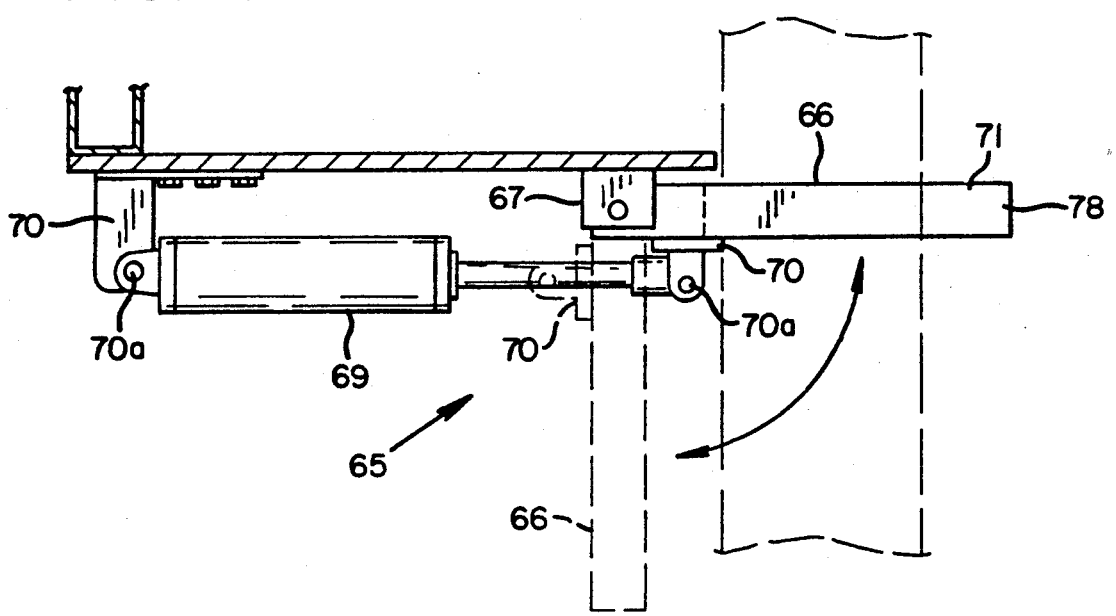
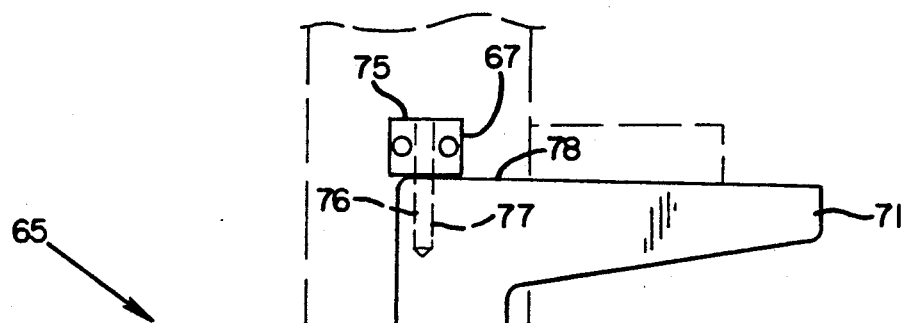
FIG. 4B
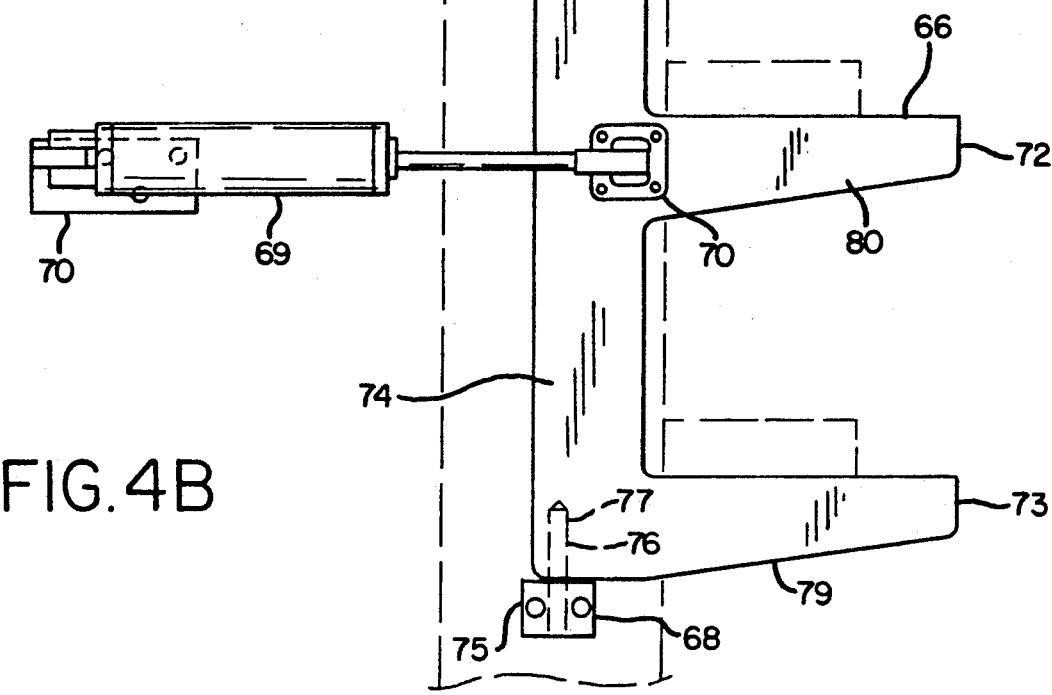

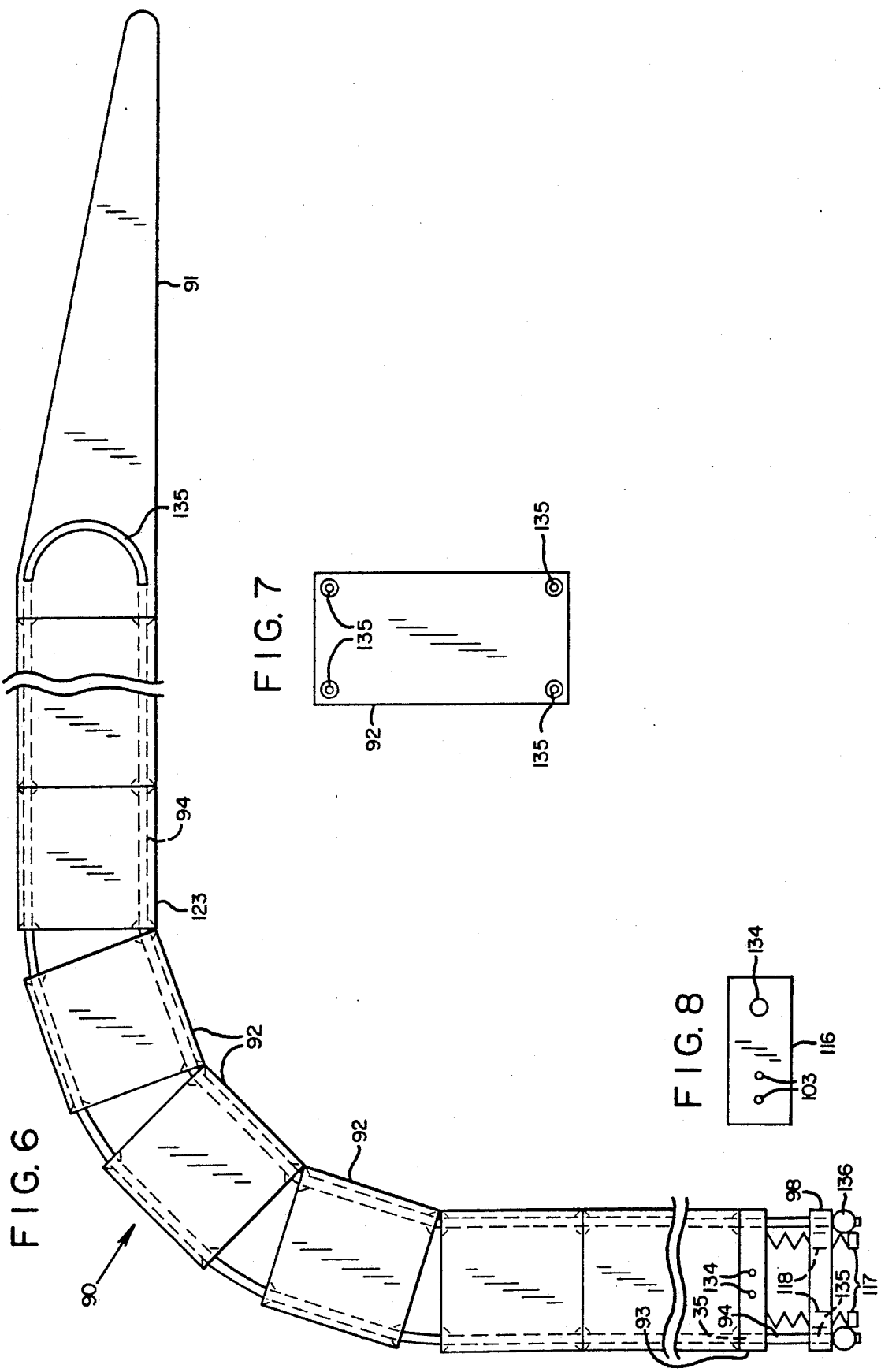

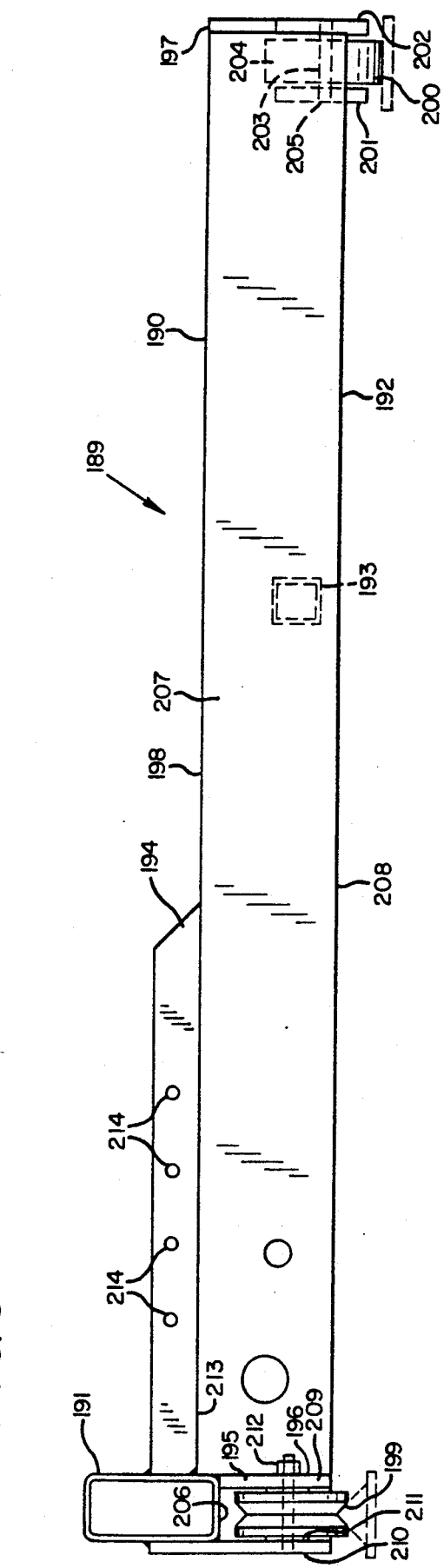

AUTOMATIC SELF-CONTAINED STACKING MACHINE

BACKGROUND OF THE INVENTION

The present invention is directed to automatic stacking machines, and in particular, to self-contained machines for stacking elongate, stackable workpieces.

Automatic stacking machines are well known in the prior art. Extended arm-type hoisting stackers are used in the wood products industry to stack processed workpieces for shipping. In the operation of an extended arm-type hoisting stacker, processed workpieces are moved along an inclined surface and delivered to the extended arms of the stacker. The individual workpieces are collected on the extended stacker arms until a single layer of a predetermined number of workpieces is accumulated. The single layer of workpieces on the extended stacker arms are then moved to a position over the workpiece stack being formed. The stacker arms are then retracted from beneath the single layer of workpieces, depositing same on top of the formed stack which is supported in a raised position by a separate scissor-type indexable table. The stacker arms return to their initial extended position to receive further processed workpieces and to form another single layer. The stack is then lowered by indexing the scissor-type table to a position for receiving the next single layer. The above-described stacking sequence is repeated until a formed stack is completed on the scissor table. At that time the formed stack is removed from the scissor table, and the formation of a new stack is commenced. Extended-type arm stackers are large units which are permanently installed in, for example, a wood remanufacturing facility. They also require a substantial amount of floor space since the workpieces are raised to stack height along the inclined surface of the extended arm. The stack under formation is not contained within the limits defined by the length of the stacker portion of the machine. Instead, there must be sufficient room outside the periphery of the stacker itself for the extended arm to deliver the workpieces in stacked line to the formed stack. For these reasons, arm-type stackers are not easily retrofitted to an existing processing facility, particularly within confined stacking and loading areas. Extended arm-type stackers are not well-suited to a facility which produces a variety of different sized workpieces. They are limited to a relatively narrow size range of workpieces and do not accommodate variations in handling requirements for different workpieces prior to stacking. They also do not function in situations where there are variations in the process which result in the workpieces being delivered for stacking to different locations in the facility. Finally, extended arm-type stackers are stationary and cannot be readily moved from place-to-place within the manufacturing facility.

A variation of the extended arm-type stacker uses a moving continuous chain with attached T-shaped brackets to vertically lift the workpieces and place them on stacking arms. When a single layer of workpieces has been formed on the stacking arms, the workpiece feed process stops, and the arms are moved downward to floor level. Typically, the single layer of workpieces on the stacking arms is positioned over a pallet. The arms are then retracted, depositing a single work piece layer on the pallet. This retraction step is conducted by moving the stacking arms laterally out of the way of the workpiece layer which requires an amount of free, unusable space being available alongside the stacker to accommodate the stacking arms which is a least equal the length of the stacker arms. The arms are then moved to an extended position and then vertically upward to receive another layer of workpieces. When the next layer of workpieces is deposited on the stacking arms, they are again moved downward, as described above, and the workpiece layer stacked atop the prior deposited layer. These steps are repeated until the stack is completed, at which time the pallet is removed and a new stack is begun. Stack formation is accomplished by stacking the workpieces beginning at the bottom of the stacking machine and working up toward the top of the machine. There is substantial time lost each time the stacker arms with the layer of workpieces thereon are lowered from the upper loading position to the lower stack formation position in bottom-to-top stack formation. Moving chain arm-type stackers also causes many of the same problems of extended arm-type stackers. They are large, permanently installed units which cannot be readily moved from place-to-place. They require a large amount of floor space since the stacker arm during formation is not contained within the confines of the periphery of the stacker but retracts to a lateral position alongside the machine. For these reasons, moving chain arm-type stackers are also not easily retrofitted to an existing processing facility. Moving chain arm-type stackers are also not well-suited to a facility which produces a variety of workpieces. They are further limited to a relatively narrow size range of workpieces which can be engaged by the T-type brackets and do not accommodate variations in handling requirements for different workpieces prior to stacking, nor variations in the process which result in the workpieces being delivered for stacking to different locations in the facility.

A need therefore exists for an automatic stacker which can stack a wide variety of sizes of elongated workpieces, which can receive workpieces in a variety of entry feed orientations, which is compact and self-contained for conserving valuable floor space, which is readily retrofittable to existing facilities, and which is portable to and is readily movable to various locations within a facility.

SUMMARY OF THE INVENTION

The present invention satisfies the existing needs described above by providing a portable, modular, automatic, self-contained stacking machine for stacking a wide variety of elongated workpieces. The subject invention can stack a wide variety of shapes and sizes of elongated workpieces. It is compact minimizing the amount of floor space required for installation. It forms a workpiece stack within the boundary defined by the stacking machine. The present invention is self-contained and does not require a separate scissor table to support and position the load during formation. It also employs top-to-bottom stack formation which is far less time consuming than the prior art bottom-to-top method. The present invention is portable which allows it to be readily relocated from place-to-place within the facility. The subject stacking machine can be loaded from various orientations thereby maximizing its ability to handle a wide range of directional loadings starting at levels as low as 18 inches from the underlying surface on which the machine is supported.

The present invention comprises means for receiving a plurality of elongated workpieces, means for automatically raising the workpieces, means for forming a single layer of a predetermined number of workpieces, means for controlling the height and width of a stack, means for assembling layers of workpieces into a stack of predetermined height and width, and means for supporting and positioning the stack during formation.

The self-contained machine of this invention is designed for producing a stack of elongate, stackable workpieces. The machine comprises means for receiving the elongate, stackable workpieces and for conveying the workpieces in a generally vertical upward direction to an elevated point above the surface on which the stacking machine is supported. Vertical conveyance of the workpieces requires the use of a minimum lateral space for conducting that operation as opposed to arm-type hoisting stackers in which the arm is extended and takes up a significant amount of lateral space. Means for receiving the workpieces are at the elevated point and means for infeeding the workpieces to a stackable layer formation means are also provided. The lateral area in which all of the stack formation operations are conducted extends from this elevated point for infeeding the workpieces and, as opposed to known prior art stackers, to the outer longitudinal edge of the workpiece stack. Thus, the subject invention includes means for forming a stackable layer of the infed workpieces and means for depositing the formed stackable layer, both of which are located during use substantially within the above-described lateral area. Finally, the machine of the present invention includes means for receiving a plurality of deposits of the formed stackable layers and thereby forming the stack of elongate, stackable workpieces. This deposit receiving operation is also conducted within this lateral area. The means for receiving the formed stackable layer typically includes means for downwardly indexing the position of the stack formation means. In order to facilitate the compact nature of the stacking machine, the means for receiving the formed stackable layers can be located below the means for forming a stackable layer of the infed workpieces and for depositing the formed stackable layer onto the stack formation means.

The means for forming the stackable layer and the means for depositing the formed stackable layer generally comprises means extending in a substantially horizontal direction for supporting the formed stackable layer, and means for retracting the horizontal support means for depositing the formed stackable layer onto the stack formation means and thereby producing the stack of workpieces. Typically, the means for forming and depositing the formed stackable layer comprises stacking arm means attached at one end to a vertical stacker tower for the machine, the stacking arm means extending in a substantially horizontally position for supporting the formed stackable layer, and retracting into the stacker tower for depositing the formed stackable layer onto the stack formation means. The stacking arms of the prior art retract into the space adjacent the machine and outside the lateral area. The stacking arm means generally comprises a flexible stacking arm means, while its prior art counterparts are rigid in nature. Finally, at least a portion of the stacking arm means, and preferably a substantial portion of the stacking arm means, is disposed in a substantially vertical position when the stacking arm means is in a retracted position. This is in contradistinction to known stacking arms which are in a horizontal position in both the extended and retracted positions.

The conveying means comprises means for receiving and lifting the workpieces in a generally upward direction, at incremental levels in a generally vertical plane, to the elevated point for the infeeding of the workpieces. This permits infeeding of a workpiece in a continuous manner as subsequent workpieces are conveyed upwardly in a substantially uniform, ordered feed path. This receiving and conveying means preferably comprises a lift finger assembly including a plurality of horizontally-extending finger members. The workpieces are received, lifted and moved in a generally upward direction from the receiving point to the elevated point on the upper portion of the respective finger members. In order to facilitate the infeeding process, the upper horizontally-extending finger member includes means for engaging the workpiece at the elevated point and infeeding the workpieces for forming a stackable layer of the infed workpieces. The lift finger assembly can include means for incrementally moving the lift finger members in a path which generally defines a rectangular orbital cycle for receiving the workpieces, lifting the workpieces in a generally upward direction to the elevated point, infeeding the workpieces from the elevated point, and returning the lift finger members to the receiving position. The lift finger assembly can further include a support finger assembly which intermittently supports the workpieces supported at the incremental levels when the lift finger assembly receives the elongate, stackable workpieces.

Most prior art stacker are set in a fixed position and are never moved once in place. However, the subject machine is portable and readily movable to a plurality of receiving locations for producing a stack of elongate, stackable workpieces.

The foregoing and other objects, features and advantages of the invention will become more readily apparent from the following detailed description of a preferred embodiment which proceeds with reference to the drawings.

BRIEF DESCRIPTION OF THE DRAWINGS

FIGS. 4a and 4b are enlarged top and side views, respectively, of support finger assembly 65.

FIG. 6 is an enlarged, broken, detailed view of flexible stacking arm assembly 90.

FIG. 7 is an enlarged end view of an individual flexible stacking arm segment 92.

FIG. 8 is an enlarged detailed view of a flexible stacking arm drive link 116.

FIG. 9 is an enlarged side sectional view of stacking tower movable base 189.

DETAILED DESCRIPTION OF A PREFERRED EMBODIMENT

General Arrangement

Figure 1:
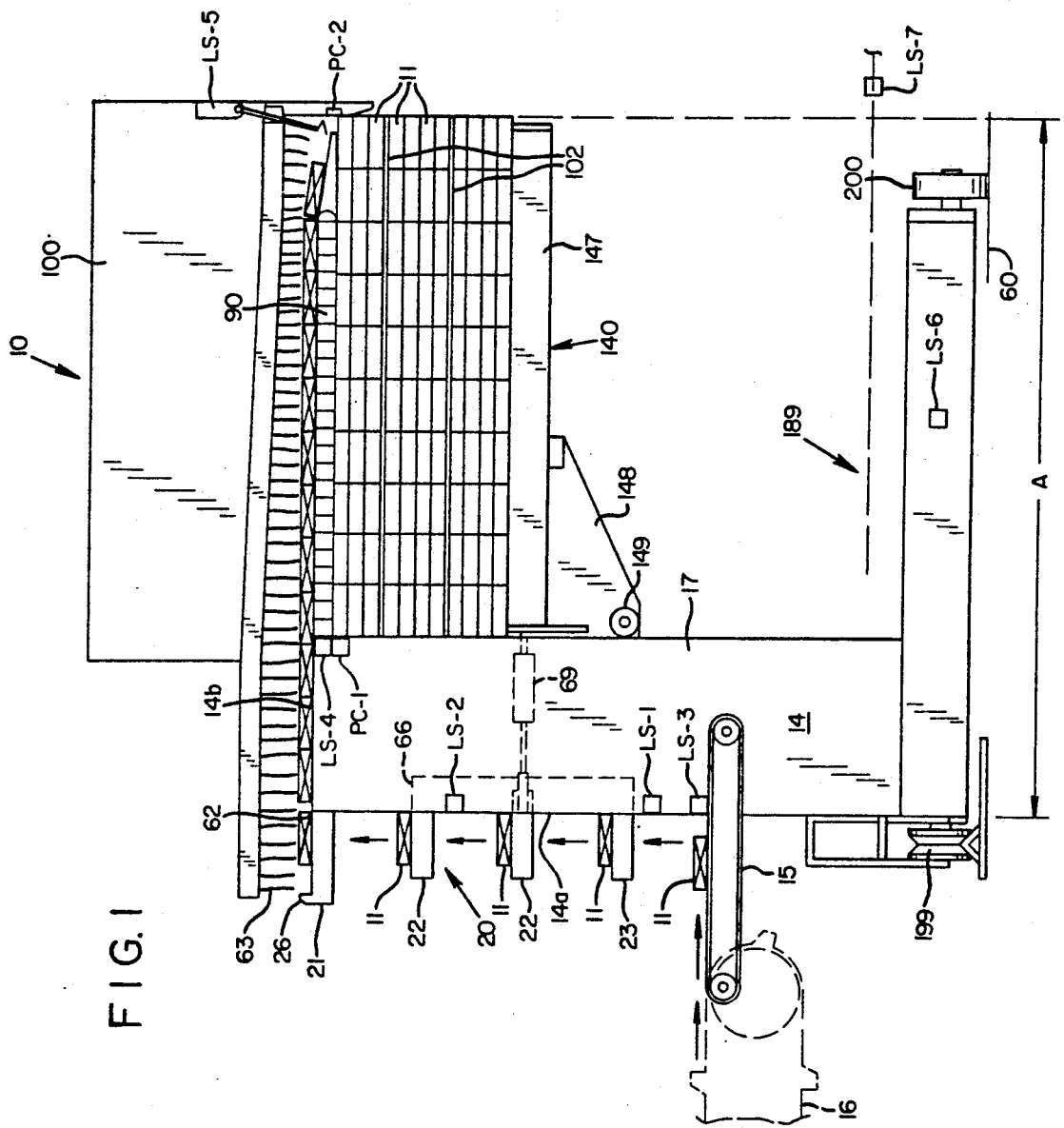
FIG. 1 is a side elevational view of the automatic self-contained stacking machine of the present invention.
Figure 2:
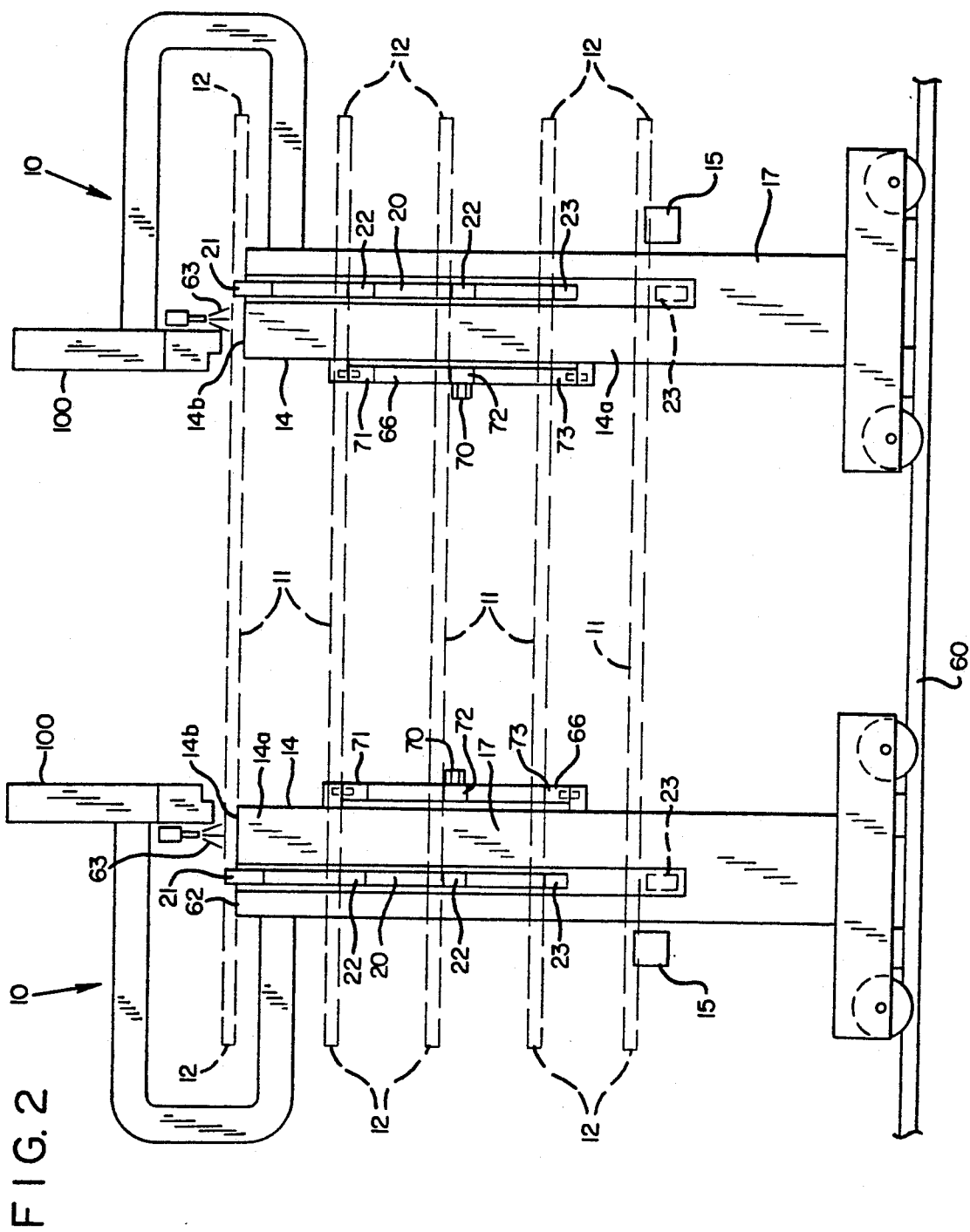
FIG. 2 is a rear elevational view of the machine shown in FIG. 1.

Referring now to FIGS. 1 and 2, two automatic self-contained stacking machines 10 are shown arranged for use in a remanufactured wood products plant (not shown). The stackers 10 can receive boards or any slender stackable product or package from a conveyor or primary machine and produces a layered stack with or without stickers. The stacker machines 10 are positioned to support these workpieces 11 near their ends 12 during the stacking operation. Processed workpieces 11 are delivered to the stacker feed belt 15 by a processing line conveyor 16. Typical workpieces are flat having a size from about ½" to 4" thick, 1" to 8" wide, at any length depending on stiffness and weight. The stacker feed belt 15 delivers the workpieces 11 to the orbiting lift finger assembly 20. Assembly 20 conveys the elongate-stackable workpieces 11 to an elevated point 62 above ground level 60. Lift finger assembly 20 moves in a rectangular orbiting cyclical path with respect to stacking tower 17 of stacker 10. Elevated point 62 is at the top of stacking tower 17. Stacking tower 17 comprises sidewalls 14, backwall 14a, and topwall 14b joined one to the other. A stackable layer of workpieces 11 are formed on support finger assembly 65. The layer of workpieces are stacked onto indexing stacking arm 90 by retracting support finger assembly 65 within stacking tower 17. By accumulating a plurality of stackable layers of workpieces 11, stacked one atop the other, the appropriate final workpiece stack can be produced.

Orbiting Lift Finger Assembly

Figure 3:
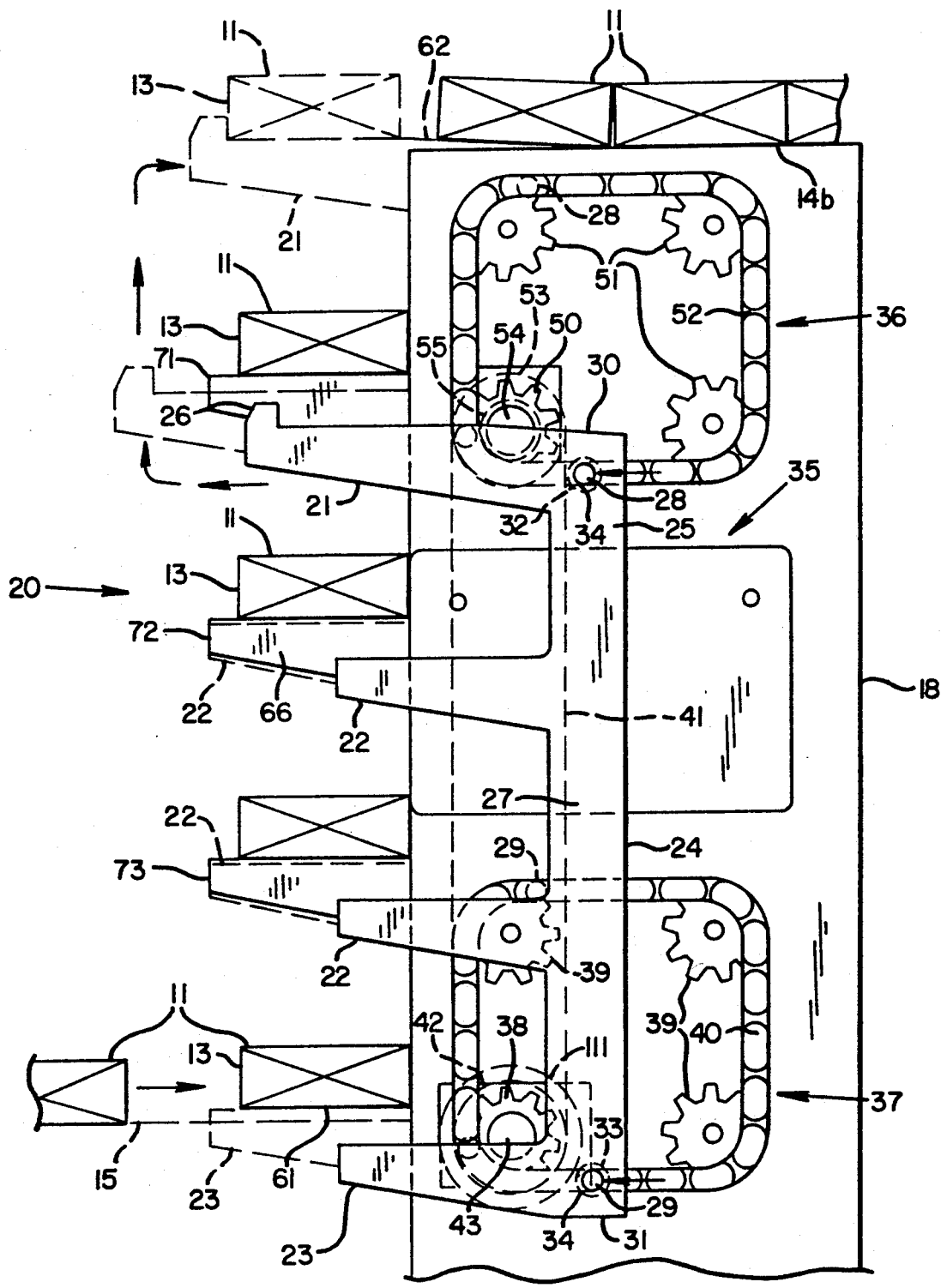
FIG. 3 is an enlarged view of lift finger assembly 20.

FIG. 3 shows an orbiting lift finger assembly 20 which includes the lift finger mechanism 25, orbital drive mechanism 35, the lift finger drive motor 19, and the orbiting lift finger mechanism mounting plate 18. The lift finger assembly 25 is comprised of one notched top lift finger 21, two intermediate lift fingers 22, and one bottom lift finger 23 which extend horizontally from a vertical lift finger mounting bar 24. The notched top lift finger 21 has a hooked end 26 to engage a side surface 13 of a workpiece 11 and to apply a lateral force thereto. A McGill # cyr-1-1/8-S bearing 34 is installed in each of two counterbored holes extending into the lift finger mounting bar 24, forming an upper mounting hole 32 near the mounting bar top 30 and a lower mounting hole 33 near the mounting bar bottom 31. The lift finger orbital mechanism 35 is comprised of an upper orbital assembly 36, a lower orbital assembly 37, and an orbital assembly timing chain 41. The lower orbital assembly 37 is comprised of a lower drive sprocket 38, three lower idler sprockets 39, a lower orbiting chain 40, a lower orbital assembly timing sprocket 42, and a lower orbital assembly drive shaft 43. The lower drive sprocket 38 is mounted on the lower orbital assembly drive shaft 43, which is mounted in the lower orbital assembly drive shaft bearings 44 (McGill # ER-16). The bearings 44 are installed in the orbiting lift finger mechanism mounting plate 18. The lower idler sprockets 39 with integral bearings are mounted on the orbiting lift finger mechanism mounting plate 18. The lower drive sprocket 38 and lower idler sprockets 39 form a rectangular pattern, and define a rectangular orbital path for the lower orbiting chain 40. Extending from the side surface of the lower orbiting chain 40 is a lift finger assembly lower mounting pin 29 which engages the bearing 34 in the lift finger assembly lower mounting hole 33, thereby pivotally attaching the lift finger assembly 25 to the lower orbiting chain 40.

The upper orbital assembly 36 is comprised of an upper drive sprocket 50 and three upper idler sprockets 51, an upper orbiting chain 52, an upper orbital assembly timing sprocket 53, and an upper orbital assembly drive shaft 54. The upper drive sprocket 50 is mounted on the upper orbital assembly drive shaft 54, which is located by the upper orbital assembly drive shaft bearings 55 (McGill # ER-16). The bearings 55 and the upper idler sprockets 51 are bolted to the orbiting lift finger mechanism mounting plate 18 such that the upper drive sprocket 50 and upper idler sprockets 51 define a rectangular orbital path for the engaged upper orbiting chain 52. Extending from the side of the upper orbiting chain 52 is a lift finger assembly upper mounting pin 28 which engages the bearing 34 in the lift finger assembly upper mounting hole 32, thereby pivotally attaching the lift finger assembly 25 to the upper orbiting chain 52.

The lift finger drive motor (not shown) is coupled to the lower orbital assembly drive shaft 43, on which are mounted the lower drive sprocket 38 and the lower orbital assembly timing sprocket 42. The orbital drive mechanism timing chain 41 engages the lower orbital assembly timing sprocket 42 and the upper orbital assembly timing sprocket 53.

The orbiting lift finger mechanism mounting plate 18 is bolted to the stacker tower side wall 14, thereby securing the orbiting lift finger assembly 20 to the workpiece stacker 10.

Support Finger Assembly

FIG. 4 depicts the support finger assembly 65 which is comprised of the support finger mechanism 66, the upper support finger assembly mounting bracket 67, the lower support finger assembly mounting bracket 68, the support finger actuating cylinder 69, and the actuating cylinder mounting bracket 70. The support finger mechanism 66 is comprised of an upper support finger 71, an intermediate support finger 72, and a lower support finger 73 which extend horizontally from the support finger mounting bar 74. Each support finger assembly mounting bracket 70 is comprised of a block 75 with an extending hinge pin 76. The hinge pins 76 are inserted into hinge pin holes 77 in the support finger assembly top surface 78 and bottom surface 79. The brackets 70 are then bolted to the stacker tower side wall 14, thereby pivotally attaching the support finger mechanism 66 to the stacker tower side wall 14. The support finger actuating cylinder 69 (Wabco # P68174-3040) is pivotally attached at one end to the stacking tower side wall 14 by a clevis bracket 70 (Wabco # P57333) and clevis pin 70a (Wabco # J800017). The actuating cylinder 69 is pivotally attached at its opposite end to the support finger assembly side surface 80 additional clevis bracket 70 and clevis pin 70a.

Flexible Stacking Arm

Figure 5:
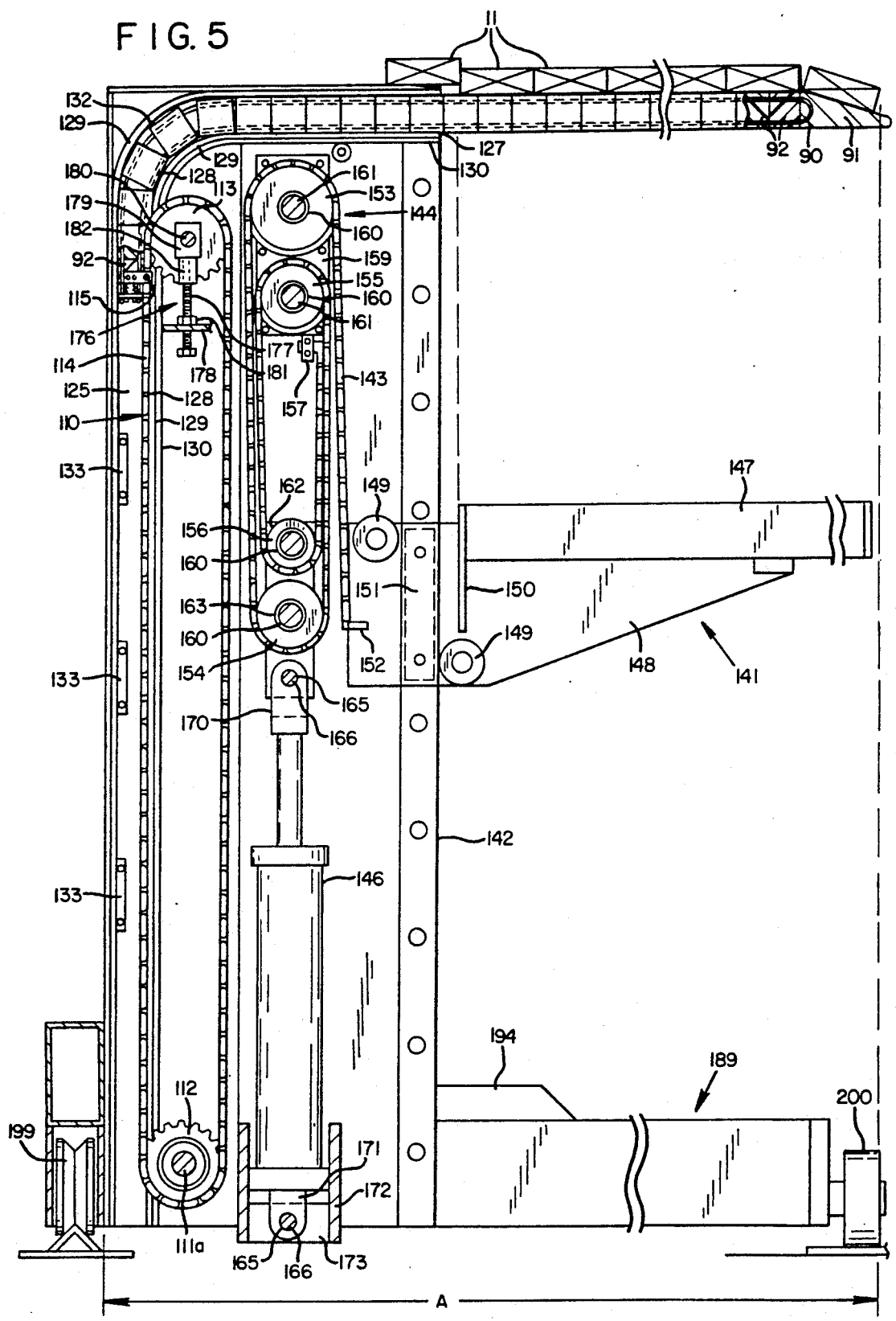
FIG. 5 is an enlarged sectional view of the stacker of FIG. 1.
Figure 10:
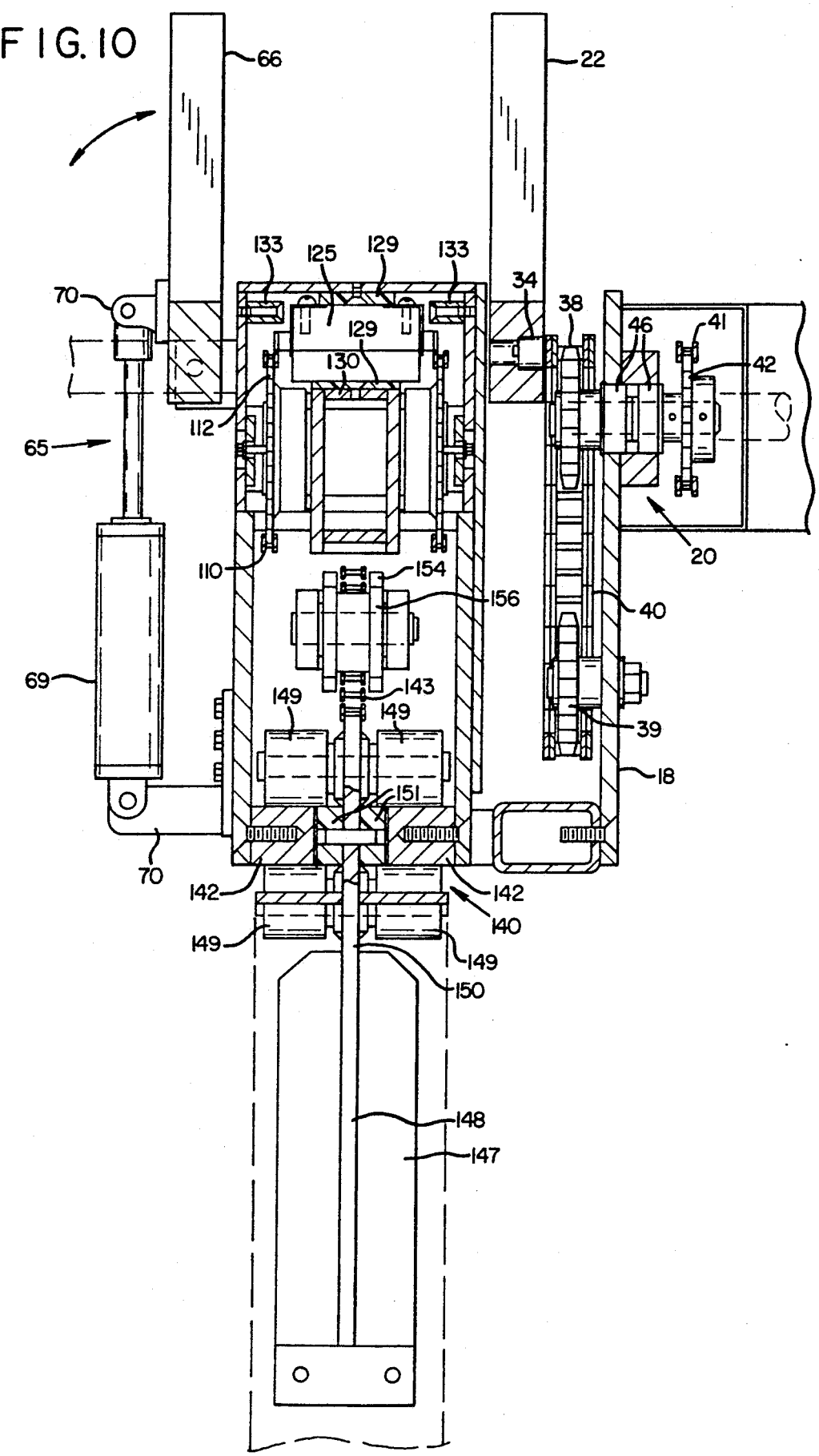
FIG. 10 is an enlarged top sectional view of stacking tower 17.

FIG. 5 describes the flexible stacking arm 90 and its retraction mechanism 110. The flexible stacking arm 90 which is horizontal in the extended position, is comprised of the stacking arm tip 91, a plurality of pivotally connected stacking arm segments 92, the stacking arm end 93, and the flexible stacking arm tension cables 94. The stacking arm is preferably fabricated of a flexible polymeric material, although a flexible metal material can be employed. Also, various combinations of polymeric and metal materials can be used.

The stacking arm retraction mechanism 110 is comprised of the stacking arm drive motor 111, stacking arm drive sprockets 112, stacking arm idler sprockets 113, stacking arm drive chains 114, and the stacking arm drive chain tensioner 115. In the retracted position, the stacking arm 90 is in a substantially vertical position. In this way, stacking arm 90 remains within lateral area "A" (see FIG. 1). The stacking arm drive sprockets 112 are mounted on the shaft 111a of the hydraulic stacking arm drive motor 111. The stacking arm idler sprockets 113 are held in position directly above the drive sprockets 112 by the stacking arm drive chain tensioner 115 which is connected to the stacker tower side wall 14. The stacking arm drive chain tensioner 176 is comprised of a tension rod 177, a tensioner mounting plate 178, a tensioner yoke 179, an idler sprocket shaft 180, and a threaded tensioner lug 181. The stacking arm idler sprocket 113 is mounted on the idler sprocket shaft 180. The idler sprocket shaft 180 is rotatably mounted in the tensioner yoke 179. The tensioner rod 177 passes through a hole in the tensioner mounting plate 178 and the threaded tensioner lug 181 which is permanently attached to the mounting plate 178, which is welded to the flat bar 130. The tensioner rod 177 terminates in the tensioner rod pilot hole 182 in the tensioner yoke 179. The stacking arm chains 114 are continuous roller chains which engage the drive sprockets 112 and the idler sprockets 113. Extending from each stacking arm chain 114 is a stacking arm drive pin 116 which inserts into the stacking arm end 93. The flexible stacking arm 90 is comprised of the stacking arm tip 91, stacking arm segments 92, and a stacking arm end 93, stacking arm tension cables 94, an adjusting block 98. The stacking arm tip 91, formed from a polymeric material, has two tension cable channels 135 in which are located the tension cables 94. After exiting the tension cable channels 135 in the tip 91, the tension cables 94 pass through the tension cable channels 135 in the segments 92, joining the segments 92 and the tip 91. After passing through the channels 135 in each of the segments 92, the cables 94 pass through tension cable channels 135 in the stacking arm end 93, and through similar channels 135 in the adjusting block 98. After passing through the adjusting block 98, the tension cables 94 have tension cable end lugs 136 rigidly attached which prevent slippage of the cable 94 as tension is applied to the cable 94 by the tension screws 117. The tension screws 117 pass through threaded adjusting holes 118 and bear against the stacking arm end 93. In each side of the stacking arm end 93 are threaded drive link holes 134. Mounting bolts 119 pass through a mounting holes 103 in the stacking arm drive links 116 and thread into the drive link holes 134, thereby connecting the stacking arm drive chains 114 to the flexible stacking arm 90. The flexible stacking arm 90 retracts into the stacking arm channel 125 in the stacker tower 17. The stacking arm channel 125 is a rectangular channel which begins at the stacker tower base 189, and which extends vertically adjacent to the stacker tower back wall 14a to the top of the stacker tower 17, where the channel 125 curves approximately 90 degrees and extends adjacent to the stacker tower top wall 14b to the channel upper end 127 which is formed by an opening at the top of the stacker tower back wall 14a. The stacking arm channel bottom surface 128 is formed by an ultra high molecular weight polymer (UHMW) strip 129 bolted to a flat bar 130 which is curved in the shape of the channel 125 as described above. The channel bottom surface 128 is held in position in the stacker tower 17 by channel support brackets 131 which are bolted to the stacker tower side walls 14. The channel top surface 132 is formed by an UHMW strip 129 bolted to the stacker tower rear wall 14a and top wall 14b, and which is also curved in the shape of the channel 125 as described above. The sides of the stacking arm channel 125 are defined by UHMW side blocks 133 which are bolted to the stacker tower side walls 14.

Stacking Table Assembly

The stacking table assembly 140 is shown in FIG. 6 and is comprised of the stacking table mechanism 141, the stacking table track 142, the stacking table chain 143, the fixed block 144, the cylinder block 145, and the stacking table actuating cylinder 146. The stacking table mechanism 141 is comprised of the stacking table 147, the stacking table base 148, the stacking table track rollers 149. The stacking table 147 is a closed hollow square tube, for example, 5" wide by $3\frac{1}{4}$" high by 48" long. One end has a notched, vertical mounting plate 150 which fits over the stacking table base when installed. The stacking table 147 rests on the upper surface of the stacking table base 148 and is attached thereto by bolts which pass through the stacking table 147 and into the stacking table base 148. Shims can be inserted, if needed, to level the stacking table 147 where the bolts pass therethrough. The stacking table base 148 fits between the stacking table tracks 142 and is maintained in position by the tracks 142 and four stacking table track rollers 149. UHMW polymeric spacer plates 151 are bolted to the stacking table base 147 to provide a low friction sliding surface where the stacking table base 147 slidably engages the stacking table tracks 142. The stacking table tracks 142 are 2" by 2" by 60" cold rolled steel. One track 142 is bolted in a vertical position to the inside of each stacker tower side wall 17. The track rollers 149 are Torrington Track Rollers # YCRS-40. The stacking table chain 143 is attached to the stacking table base 148 at the stacking table chain attachment slot 152. The stacking table chain 143 then engages the fixed block upper pulley 153, the cylinder block lower pulley 154, the fixed block lower pulley 155, the cylinder block upper pulley 156, and is attached to the fixed block 144 at the fixed block chain clamp 157. The fixed block 144 has a horizontal base plate 158 with two vertical side walls 159 welded thereto. The upper pulley 153 and lower pulley 155 are rotatably mounted by Chrysler Amplex Oilite bearings # FF1202-3 on fixed block pulley shafts 161 which extend horizontally between the side walls 159. The vertical side walls 159 have tapped mounting holes 162 by which the fixed block 144 is bolted to the stacking tower side walls 17. The cylinder block 145 is comprised of two vertical rectangular cylinder block side walls 162 each with two holes 163 drilled to accept the cylinder block pulley shafts 164. One end of each shaft 164 is welded to one side plate 162. The upper pulley 156 and lower pulley 154 are mounted on the pulley shafts 164 using Chrysler Amplex Oilite bearings 160. The shaft holes 163 in the other side plate 162 fit over the pulley shafts 164 and abut the bearings 160. The pulley shaft free ends 167 extend through the pulley shaft holes 163, and each is fixed in position by a snap ring 168 inserted into a snap ring groove 169 near each pulley shaft free end 167. Each side wall 162 also has a clevis pin hole 165 to receive an actuating cylinder attachment clevis pin 166 which connects the stacking table actuating cylinder shaft end 170 to the cylinder block 145. The stacking table actuating cylinder base end 171 fits into the actuating cylinder mounting bracket 172. The actuating cylinder mounting bracket 172 is comprised of a horizontal base plate 173 with a transverse clevis pin hole 165, and two vertical side walls 174 welded to the base plate 173. The actuating cylinder base end 171 and the bracket 172 are attached to the movable base 189 by a clevis pin 166 which passes through a clevis pin hole 165 in the actuating cylinder base end 171 and clevis pin holes 165 in the actuating cylinder mounting bracket 172 and movable base channels 192. The clevis pin 166 is held in place by a snap ring 168 inserted into a snap ring groove 169 in the clevis pin 166.

Stacking Tower Movable Base

The stacker tower movable base 189 is shown in FIG. 7. The stacker tower movable base 189 is comprised of a main member 190, a transverse member 191, two V-wheel assemblies 199, and a flat wheel assembly 200. The main member 191 is comprised of two tempered steel channels 192, an infeed end plate 195, a support member 193, and two stacking tower side wall supports 194. The two 6" tall by 3" wide by 66" long steel channels 192 are parallel to each other 6" apart. The 12" by 5" by ¼" infeed end plates 195 are welded to the channel infeed ends 196 flush with the channel inner surface 207 and bottom surface 208. The infeed end plates extend outward past the channel outer surfaces 9" to form V-wheel inner plates 209 near each end of the transverse member 191. The support member 193 is placed between and welded to the channels 192 at a position 39" from the infeed end of the channels 192. The flat wheel assembly 200 is welded to the channel output ends 197. The flat wheel assembly 200 is comprised of an inner plate 201, an outer plate 202 joined by a flat wheel axle 203 which carries the flat wheel 204. The axle 203 is a ½" by 4" long bolt which passes through axle holes 205 in the inner plate 201 and outer plate 202, and supports the flat wheel 204 between the plates. The inner plate 201 is 6" wide by 4" tall by ¼" thick and fits between the channels 192. The outer plate 202 is 7" tall by 12" wide by ¼" thick and abuts the channel output ends 197 flush with their upper surface 198. The transverse member 191 is a rectangular steel tube 6" by 3" by 31" long. The transverse member 191 is welded in a transverse position to channel input ends 197 with the transverse member bottom surface 206 at a level 1" below the channel upper surface 198. A V-wheel assembly 199 is located near each end of the transverse member 191. The V-wheel assembly 199 is comprised of an outer plate 210, a V-wheel inner plate 209, an axle 203, and V-wheel shim washers 210. The axle 203 passes through an axle mounting hole 205 in the outer plate 210, through the V-wheel 204 and shim washers 211, and through an axle mounting hole 205 in the inner plate 209, and is secured in place by the axle hex nut 212. Multi-directional casters can be substituted for the V-wheel assembly to effect multi-directional movement of the stacking machine. A stacking tower side wall support plate 194 is welded to each channel upper inner surface 213 at each channel infeed end 196. The side wall support plate 194 has bolt holes 214 through which side wall mounting bolts (not shown) pass to secure the stacking tower side walls 14 to the stacking tower movable base 189. The two stacker tower side walls 14, shown in FIG. 1, are 12" wide by 60" tall by ¼" aluminum sheets with a plurality of holes for attaching the parts described above.

Stack Formation Control and Operation

Referring again to FIGS. 1 and 2, processed workpieces 11 are moved from a remote source (not shown) by processing line conveyor 16 to stacker feed belt 15. Stacker feed belt 15 receives the workpieces and moves each toward sidewall 14 of stacking tower 17. A limit switch LS-1 is connected to stacking tower 17 and is positioned within the path of the incoming workpiece. When a workpiece 11 is detected by limit switch LS-1, the stack formation operation is initiated. Prior to such initiation, intermediate lift fingers 22 and top lift finger 21 support workpieces 11 located at incremental levels between receiving point 61 and elevated point 62.

Upon initiation of the stack formation operation, workpiece 11 moves onto bottom finger 23, and lift finger assembly 20 with the four workpieces 11 on fingers 21-23 are moved upwardly with respect to the stacking tower 17 (see FIG. 3). Lift finger assembly 20 moves through a rectangular, orbital cycle during the workpiece conveying and infeeding operation. The four workpieces are moved to their next vertical incremental level adjacent support fingers 71-73 and stacking tower top 14b. At this point, workpiece 11 which was located on stacker input conveyor 15, has been lifted to a first incremental level adjacent to lower support finger 73. Similarly, second and third workpieces 11 resting respectively on intermediate lift fingers 22 are now adjacent upper and intermediate support fingers 71 and 72, while the top lift finger 21 has moved the fourth workpiece 11 to a position adjacent elevated point 62 and stacking tower top 14b. At this upper vertical position of lift finger assembly 20, limit switch LS-2 is actuated and support fingers 65 are moved to an extended position supporting the first, second and third workpieces. The fourth workpiece 11 (in phantom) on top lift finger 26, as well as the entire lift finger assembly 20, is then retracted laterally inward toward stacking tower 17. Top lift finger hooked end 26 engages the end of workpiece 11 and infeeds it to a position atop top section 14b of stacking tower 17.

Lift finger assembly 20, after the workpiece 11 is moved onto top 14b, is moved orbitally and vertically downward and then orbitally laterally away from stacking tower 17 until it is detected by limit switch LS-3 and is brought to a stop. At this point, lift finger assembly has completed its rectangular, orbital cycle so that fingers 21 and 22 are positioned to support first, second and third workpieces 11. The actuation of limit switch LS-3 also retracts support finger assembly 65. Limit switches LS-2 and LS-3 are arranged in series affect the above-described functional operations. Lift finger assembly 20 is again in position for receiving, conveying and infeeding subsequent workpieces.

As the infeeding procedure is repeated, the workpiece located on top 14b will be moved laterally (by the next incoming workpiece moved laterally by hooked end 26) onto flexible stacking arm 90. The infed workpieces are maintained in alignment and position by a series of nylon bristle brushes 63. Stacking arm 90 is the location for the formation of respective stackable layers of the infed workpieces which are moved by infeeding the workpieces from the elevated point 62. The infeeding process will continue until a completed stackable layer is formed and the outer longitudinal edge of the workpiece stack, i.e., the outer edge of the outermost workpiece 11, is detected by limit switch LS-5. When limit switch LS-5 is actuated, support finger assembly 90 is fully retracted into stacking tower 17 so that stacking arm tip 91 is moved within the confines of stacking tower 17. Limit switch LS-4 detects when support finger assembly 90 has reached the fully retracted position. When support finger assembly is fully retracted, the formed stackable layer is deposited directly onto stacking table assembly 140 or onto the top of any previously deposited formed stackable layers located on stacking table 140. A Banner Retroflective photoelectric cell assembly pC-1 is provided so that a beam of photoelectric light is emitted directed underneath the support finger assembly 90 and is received by a retroreflector element PC-2. When the stackable layer of workpieces is deposited onto the stacking table 140, the light beam is interrupted and the stacking table 140 is indexed downwardly to a point which will permit support finger assembly 90 to be extended for infeeding a subsequent stackable layer of workpieces can be accumulated onto support finger assembly 90. More specifically, when the stacking arm 140 is indexed downwardly non-interruption of the photoelectric light is detected by photoelectric cell assembly PC-1. The support finger assembly is then moved from a retracted to an extended position and the process of infeeding workpieces from elevated point 62 can be commenced again.

When the number of deposited stackable layers of elongate, stackable workpieces are deposited so that they are accumulated to form a predetermined number of layers, the completed workpiece stack is removed from stacking arm 140 by conventional means such as a conveyor, a forklift, or even manually, respectively. As depicted, stacking arm assembly 140 indexes downwardly until it is detected by limit switch LS-6. The completed workpiece stack is then carried off by outfeed chain conveyor 64. When the complete workpiece stack is detected by limit switch LS-7 it is clear of the stacking arm assembly 140 and the outfeed chain conveyor can be stopped. Stacking arm assembly 140 is then moved upwardly until it interrupts the light beam emitting from photoelectric cell assembly PC-1. It is then re-set immediately below the light beam, and the workpiece stacking process is repeated.

Various conventional limit switches which can be employed in the control system of this invention are Allen Bradley series 802-T limit switches. Moreover, the system can be controlled by various conventional programmable microprocessors such as the Allen Bradley PLC-150 with add-on modules. The counter for determining the number of stackable layers in each completed stack is part of the microprocessor program. The controller for each of the stackers 10 can be individually and readily coupled to each individual stacker unit employing utility services, including electrical, pneumatic and hydraulic fluid lines, which are of the quick-connect type.

A sticker hopper-placer unit 100 conventionally used in stacker applications can also be provided herein for introducing sticker elements 102 into the stack for stabilizing the completed workpiece stacks. These units may be supported from above by a beam longer than the stack, or from reach-around support arms. In this case, one hopper is permanently attached to each stacker unit for convenience.

Having illustrated and described the principles of my invention in a preferred embodiment thereof, it should be readily apparent to those skilled in the art that the invention can be modified in arrangement and detail without departing from the spirit and scope of the accompanying claims.

I claim:

1. A method for producing a stack of elongate, stackable workpiece at a receiving location comprising:
   providing a plurality of readily movable, self-contained stacking modules;
   temporarily positioning said stacking modules for cooperatively receiving a plurality of elongated workpieces, and for cooperatively producing a stack of said workpieces;
   said temporary positioning step further including positioning said stacking modules relative to each other such that the distance between their respective outer edges in less than the length of said elongated workpieces;
   providing a control system for interconnecting activating, and controlling said stacking modules for providing cooperative operation of said modules to receive and produce a stack of said workpieces;
   controllably interconnecting said stacking modules with said control system thereby forming a stacking machine;
   activating said stacking machine thereby initiating the stack formation operation;
   receiving said elongate, stackable workpieces from an infeed direction;
   conveying said elongate, stackable workpieces to an elevated point above ground level;
   providing a location for the formation of a stackable layer of said infed workpieces;
   infeeding said workpieces from said elevated point to said stackable layer formation location;
   forming a stackable layer of said infed workpieces at said stackable layer formation location;
   depositing said formed stackable layer at said workpiece receiving location;
   accumulating a plurality of said deposits of said formed stackable layers one atop the other at said workpiece receiving location thereby producing said stack of elongate, stackable workpieces,
   said stackable layer formation and deposition steps and said stack accumulation step, respectively, being conducted substantially within a lateral area extending from the elevated point for infeeding said workpieces to an outer longitudinal edge of the stackable layer formation location;
   deactivating said stacking machine; and
   disconnecting said interconnecting control system from said stacking modules thereby disassembling said stacking machine.

2. The method of claim 1, which includes the step of depositing said formed stackable layer at a receiving location located below said stackable layer formation location.

3. The method of claim 2, which includes the step of downwardly indexing the position of said receiving location for accumulating said formed stackable layers.

4. The method of claim 1, which includes the step of horizontally supporting said workpieces on a horizontal support during said stackable layer formation, and retracting said horizontal support for depositing said formed stackable layer at said receiving location.

5. The method of claim 4, wherein said horizontal supporting step comprises horizontally supporting said workpieces on a flexible stacking arm, and said depositing step comprises retracting said flexible stacking arm.

6. The method of claim 4, wherein said retracting step comprises moving at least a portion of said horizontal support to a substantially vertical position.

7. The method of claim 1, wherein said conveying step comprises receiving and lifting the workpieces in a generally upward direction, at incremental levels in a generally vertical plane, to the elevated point for said infeeding of the workpieces.

8. The method of claim 1, which further includes the step of providing a lift finger assembly including a lower and an upper horizontally-extending finger member depending in vertical alignment from a vertically disposed support member, and further includes receiving said workpiece on an upper surface of said respective finger members and lifting said workpieces in a generally upward direction from the receiving point to the elevated point.

9. The method of claim 8, which further includes the step of engaging the workpieces at the elevated point by said upper horizontally-extending finger member and infeeding said workpieces by movement of said finger member for forming a stackable of said infed workpieces.

10. The method of claim 8, wherein said conveying and workpiece layer formation steps comprise incrementally moving said lift finger assembly in a path which generally defines a rectangular orbital cycle for receiving said workpieces, lifting said workpieces in a generally upward direction in successive increments through incremental levels to said elevated point, infeeding said workpieces from said elevated point, and returning said lift finger members to said receiving position.

11. The method of claim 10, which further includes the step of intermittently supporting said workpieces at said incremental levels when said lift finger assembly receives said elongate, stackable workpieces.

* * * * *